UNITED STATES PATENT OFFICE.

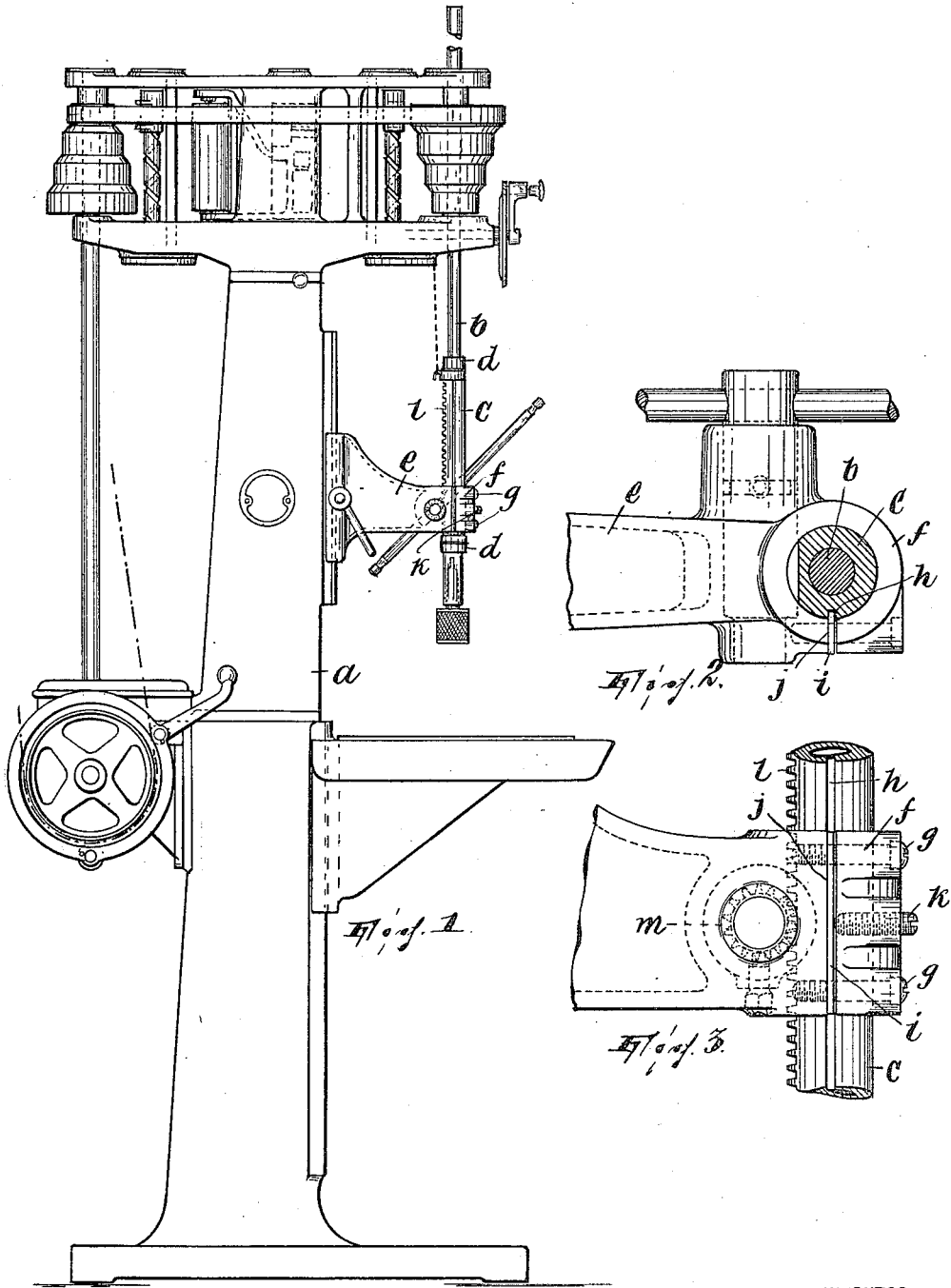

GRANT SIPP, OF PATERSON, NEW JERSEY.

MEANS FOR GUIDING A RECIPROCATING NON-ROTATING MACHINE ELEMENT.

1,139,591.  Specification of Letters Patent.  Patented May 18, 1915.

Application filed July 25, 1914. Serial No. 853,068.

*To all whom it may concern:*

Be it known that I, GRANT SIPP, a citizen of the United States, residing at Paterson, in the county of Passaic and State of New Jersey, have invented certain new and useful Improvements in Means for Guiding a Reciprocating Non-Rotating Machine Element, of which the following is a specification.

This invention relates to mechanisms of the class in which, as in the case of the drill-spindle-carrying sleeve and the guiding arm therefor of a drill press, a reciprocating element is kept from turning in a suitable guide therefor by a feather entering a spline in the reciprocating element, and it consists in the novel combination of parts hereinafter described and finally embodied in the clauses of the claim whereby the adjustment of the guide in lost-motion-preventing relation to said reciprocating element and the securing in place of the feather may be accomplished with facility, accuracy and substantially absolute permanence.

In the accompanying drawing, Figure 1 is a side elevation of a drill press provided with my improvement; and, Figs. 2 and 3 are a plan and a side view, partly in section, of the improvement.

In the drill press $a$ is the usual spindle $b$, which may be rotated in any desired manner, the same being journaled as usual in a sleeve $c$ in which it is confined against vertical movement relatively thereto by the collars $d$ fixed on the spindle, so that as the sleeve is raised or lowered by any suitable means the spindle is raised or lowered with it.

An arm $e$ projects from the frame of the machine, affording in its split cylindrical portion $f$ a guide for the sleeve, so much being according to the usual construction. The said split portion $f$ is provided with screws $g$ for contracting said portion into snugly fitting relation to the sleeve. The sleeve has a longitudinal spline $h$ and for keeping the sleeve against rotation $i$ designates a feather plate which is held fixed in the split portion $f$ of the arm $e$ as follows: Said feather plate is penetrated by the screws $g$, and it is bound against the face $j$ of one side of the split by a set screw $k$ preferably arranged between the set screws $g$.

By manipulating the screws $g$ and $k$ it will be obvious that not only may a very nice adjustment of the split portion $f$ of the arm $e$ to the sleeve be obtained, so that the latter will slide freely but without lost motion, but that when the adjustment is effected the feather plate will be held rigidly in position. Further, that because the feather plate is held against the fixed side of the split (face $j$) sleeve $c$ must always retain a constant position so far as rotary movability in the arm $e$ is concerned, assuming of course that the feather snugly fits the spline, as shown, wherefore, notwithstanding the adjustability of the portion $f$ into proper embracing relation to the sleeve, the teeth $l$ of the sleeve and the teeth of the pinion $m$ for raising and lowering it always keep precisely the same relation to each other.

Having thus fully described my invention, what I claim and desire to secure by Letters Patent is:

1. In combination, a guiding arm formed with a split guiding portion, a reciprocating member guided in said portion and having a longitudinal spline, a contracting screw tapped into said portion of the arm and traversing the split, a feather device arranged in said split and engaging the spline, and an expanding screw tapped into said arm at one side of the split and bearing against the feather.

2. In combination, a guiding arm formed with a split guiding portion, a reciprocating member guided in said portion and having a longitudinal spline, the part of said guiding portion at one side of the split being a rigid part of the arm and the part at the opposite side of the split being movable to expand and contract said portion, a feather device arranged in the split and held bearing against the fixed part of said guiding portion and snugly fitting the spline, and means to expand and contract said split portion.

In testimony whereof I affix my signature in presence of two witnesses.

GRANT SIPP.

Witnesses:
JOHN W. STEWARD,
WM. D. BELL.